Jan. 7, 1969

W. EIRICH ET AL 3,420,507

MIXING APPARATUS

Filed Feb. 14, 1967

INVENTORS
WILHELM EIRICH
GUSTAV EIRICH

BY
Curtis, Morris + Safford
ATTORNEYS

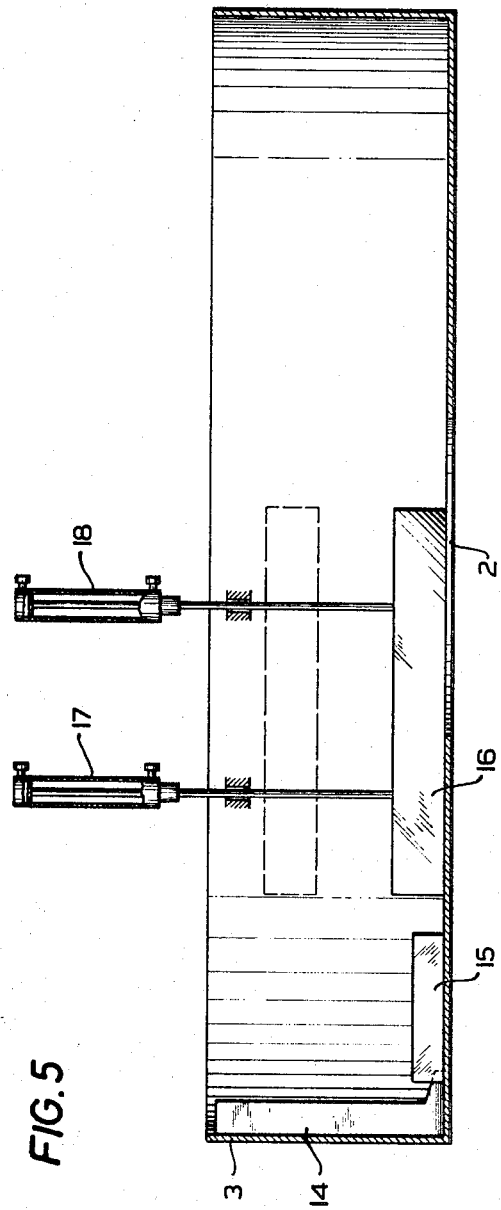

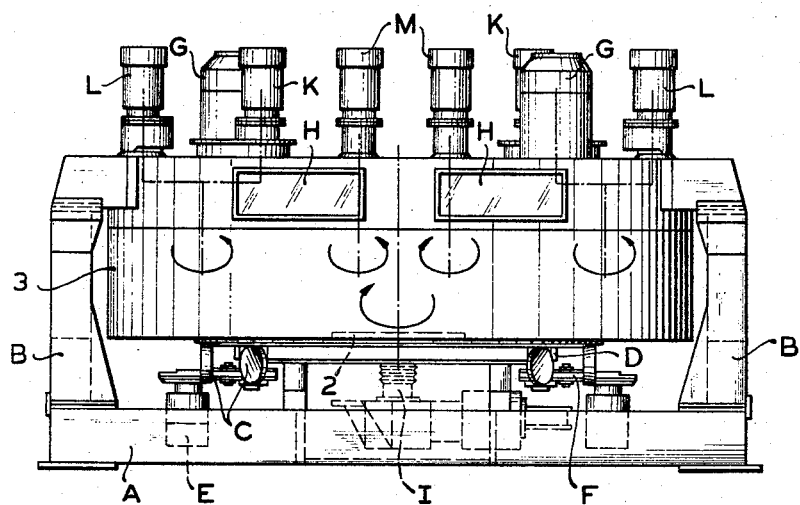
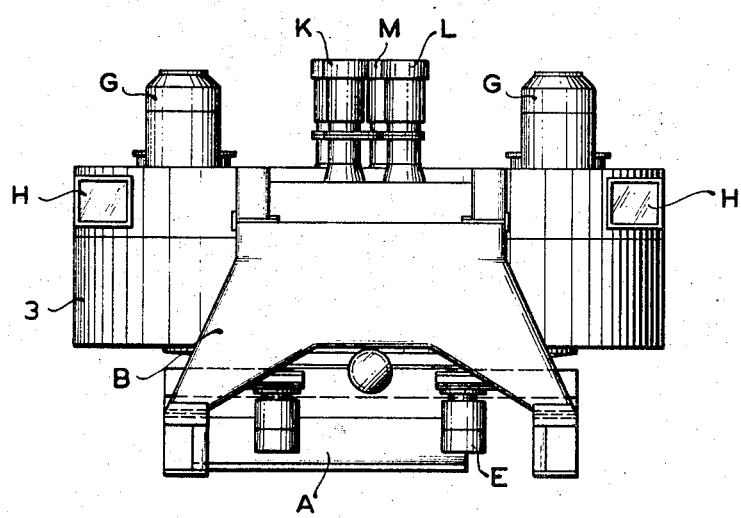

INVENTORS
WILHELM EIRICH
GUSTAV EIRICH

ATTORNEYS 3,420,507
MIXING APPARATUS
Wilhelm Eirich, Bahnhofstr. 19, and Gustav Eirich,
Waldurner Str. 46, both of Hardheim, Nordbaden,
Germany
Filed Feb. 14, 1967, Ser. No. 615,941
Claims priority, application Germany, Feb. 19, 1966,
E 31,074
U.S. Cl. 259—84        13 Claims
Int. Cl. B01f 9/08; B28c 5/14

ABSTRACT OF THE DISCLOSURE

Invention relates to mixing apparatus having a rotary bowl and a system of implements driven in a direction opposite the direction of the bowl in which at least one other system of implements is provided substantially diametrically opposite the first system and driven in the same direction as the bowl itself and preferably at a higher peripheral speed than the first system.

---

The invention relates to mixing apparatus, and particularly to a mixer with a rotary bowl and a system of mixing implements rotated in the opposite direction.

Known mixers have a system carrying mixing implements and rotating about an axis eccentric from, and parallel with, the rotary axis of the bowl. In these mixers either the rotary direction of this system is the same as that of the bowl (so called parallel flow mixer), in which case the system is either positively driven or merely entrained by the material being mixed or the said system is driven in the opposite direction to the bowl (so-called counter-current mixers).

In the construction of mixers of this type two factors are particularly important, namely that a good rapid mixing action should be obtained and that once mixing is over the process of emptying the mixture, usually through an aperture in the middle of the bottom of the bowl, should be shortened. With automation ever gaining ground it is particularly essential to save time, and a saving of even a few seconds may be of value, but at the same time it is necessary to ensure great thoroughness in mixing. In mixers a certain difficulty arises through the fact that implements designed to provide the best possible mixing action generally have a relatively poor discharging action, and vice versa, since the constructive features of an implement having one purpose are often not conductive to the other purpose.

The invention aims to overcome these difficulties and to provide a mixer of the above type which both mixes the material thoroughly and rapidly and which, once the mixing process is over, discharges the mix completely and rapidly. This is achieved, according to the invention, in that the bowl contains, in addition to a system of implements driven in the opposite direction to the bowl, a second system of implements substantially diametrically opposite the first and driven in the same direction as the bowl itself, the implements in the second system being identical with or similar to those in the first. The radial arrangement of at least one of the systems driven in the opposite direction to the bowl, more than one such system may be provided, is such that it sweeps through the greater part of the radial region not covered by the system driven in the same direction as the bowl. It is an advantage for the system moving in the same direction as the bowl to be driven at a speed such that the radially outer portion of its implements have a greater peripheral speed than the region of the bottom of the bowl over which they sweep. Furthermore, it is particularly advantageous for the system moving in the same direction as the bowl to be driven at a higher peripheral speed than the system moving in the opposite direction to the bowl. In many applications the mixing effect in particular can be considerably increased by providing a fast moving mixing and crushing implement, either between the system driven in the same direction as the bowl and the side wall of the bowl or else substantially midway in a peripheral direction, between the system moving in the same direction as the bowl and that moving in the opposite direction, the mixing and crushing implements should be in the form of a plurality of straight or curved bars, e.g., round rods, driven about a rotary axis parallel with that of the bowl and extending substantially parallel with or inclined to the said axis, their peripheral speed being a multiple of that of the systems of implements. This last mentioned set of implements may be described briefly as "whirling rods."

Even if whirling rods are not used, three parts of the mixer namely the bowl, the system rotating in the opposite direction, and that rotating in the same direction, act on the material to be mixed at different velocities and in different directions. The material is thus caused to flow concurrently in a reverse current, a cross current and an alternating current. Slow moving portions of material attacked seldom or never by the mixing implements of known mixers, are avoided altogether by the construction according to the invention even where the material is unfavourable. The favourable circulating conditions in the bowl, far from being impaired by filling the machine very full and thereby increasing the throughput, are even improved. The time required to empty the mixer is shortened considerably as compared with normal, reverse motion or parallel motion mixers. This results inter alia from the fact that in the mixer according to the invention the paddles of the system moving in the same direction as the bowl can be dimensioned and constructed for an optimum emptying action and those of the other system for an optimum mixing action. Where whirling rods are used it may be found advisable to provide a baffle adapted to be raised and lowered in front of the rods in the rotary direction of the bowl, the baffle leading inwards substantially from the side wall of the bowl to the area swept by the system driven in the same direction as the bowl; when the emptying orifice is opened the baffle would automatically be lowered almost onto the bottom of the bowl and when the orifice is closed would be raised above the surface of the material to be mixed. The result of this is that the whirling rods are effective only during the mixing process and not during the emptying process, since because of their high peripheral speed the rods would, during the emptying process, prevent part of the material caught up by them from proceeding to the parallel-motion system chiefly responsible for emptying the bowl, and would convey the material to a different part of the bowl. Where a stationary scraper is used for the side wall of the bowl it is desirable for it to be mounted (in the rotary direction of the bowl) immediately before the radially outer end of the said baffle, which is provided before the whirling rods.

Further according to the invention the rapidity of the emptying process can be quite considerably increased by providing a baffle in the region of the system driven in the same direction as the bowl in the wake of its rotation, the baffle surrounding at least 90° of the periphery of the said system and starting substantially from the radially outermost part of the area swept thereby when the emptying orifice is opened. The baffle is automatically lowered almost onto the bottom of the bowl and thus brought into action and when the orifice is closed it is lifted above the surface of the material so that it cannot impede circulation during the mixing operation.

Such vertically adjustable baffles naturally involve a relatively large outlay on mechanical and control means, but in many applications this is quite justified and acceptable. In other cases it may be sufficient, further according to the invention, to provide a stationary bottom blade in the region of the system moving in the same direction as the bowl, in the wake of its rotation; the blade then surrounds the said system over at least 90° of its periphery, starts substantially at the radially outermost part of the area swept by the system, is located immediately above the bottom of the bowl and has a preferred maximum height of 30% of the height of the material to be mixed. To avoid any damage the blade should be suspended so that it yields resiliently. With the normal filling in the bowl the material to be mixed then flows rapidly over the blade by the action of the bowl and the system driven in the same direction. The time taken to empty the bowl, however, depends on how the remnants of material in the bowl are discharged. These remnants are stopped by the relatively low blade and accumulate in front of it, so that the paddles of the system driven comparatively rapidly in the same direction as the bowl convey it quickly into the emptying orifice.

If a stationary scraper is provided for the side wall of the mixing bowl it is particularly desirable to mount this shortly in front of the counter-current system as seen in the rotary direction of the bowl since the outer part of the bowl is then re-cleaned and the material scraped off the wall is led to the counter-current system in such a favorable way that it takes the shortest path to the emptying orifice. The effect can be further increased by providing the lower end of the side wall scraper with a rudder-like inwardly-projecting fin.

Particularly favorable effects are obtained if both the system moving in the opposite direction of the bowl and that moving in the same direction have about half the diameter of the bowl so that, taken together, they cover the whole surface of the bowl.

A counter current mixer is known in which the implement system comprises at least two mixing implements of which one takes in only the upper level of the material to be mixed and the second one, following the first at an acute angle in respect of the rotary axis of the implements and at substantially the same radius, takes in only the lower level; the second implement then moves, so to speak, within a furrow produced by the first one, and very good circulation of the material results, horizontally and particularly vertically. Where such a system is applied to the mixer according to the invention it is specially desirable for the angular position of the lower paddles, both in the system moving in the opposite direction to the bowl and in that moving in the same direction, to be selected so that the material is emptied out as rapidly as possible. Where the emptying orifice is in the middle of the bottom of the pan the angular position of the upper paddles should be chosen so that radially-inwards action is obtained with freely-flowing materials to counteract the centrifugal force, whereas an outwardly-conveying action is obtained with less readily-flowing and plastic materials.

As already mentioned, the invention is not restricted to the use of one system moving in the same direction as the bowl and one moving in the opposite direction with or without additional whirling rods. A plurality of mixing systems rotating in the same direction as the bowl or in the opposite direction or in both directions may be used, particularly in machines with a large diameter.

Some examples of the present invention are illustrated diagrammatically in the accompanying drawings, in which:

FIG. 5 is a diagrammatic vertical radial section as in FIG. 4 but showing the blade and baffles and omitting the mixing implements;

FIG. 6 is a side elevation of an enclosed mixer with a particularly large diameter;

FIG. 7 is a front elevation of the mixer shown in FIG. 6;

Figure 8:
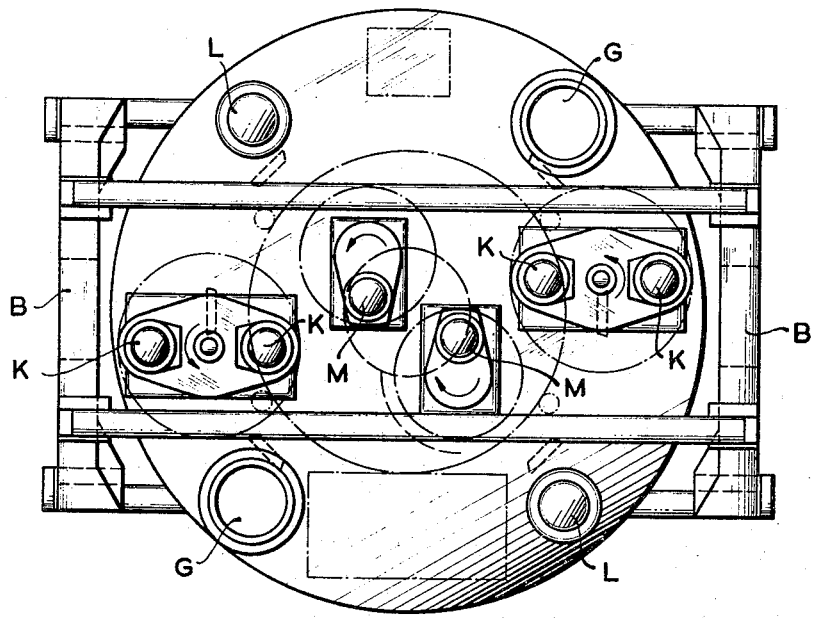
FIG. 8 is a plan view of the mixer shown in FIG. 6.
Figure 9:
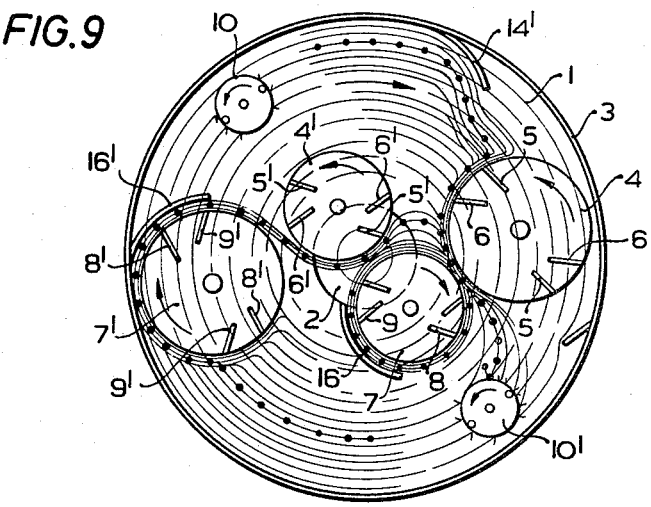
Figure 10:
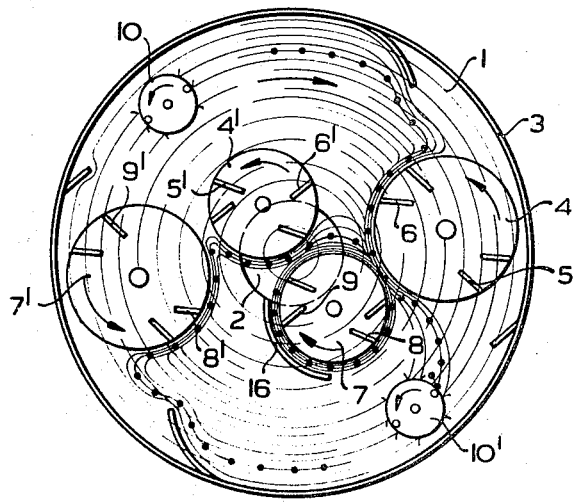

FIG. 9 explains the direction of movement and the mixing action of the implements used in the machine shown in FIGS. 6 to 8; and FIG. 10 is a view similar to FIG. 9 and illustrating a mode of operation in which the direction of rotation of one system of mixing implements is reversed.

In all the figures like references denote like members.

The chief components are the bottom 1 of the mixing bowl, an emptying orifice 2 in the centre of the bowl, a side wall 3 of the bowl, a system 4 of mixing implements comprising paddles 5 and 6 and driven in the opposite direction to the bowl 1, and a system 7 of mixing implements comprising paddles 8 and 9 and driven in the same direction as the bowl.

Figure 1:
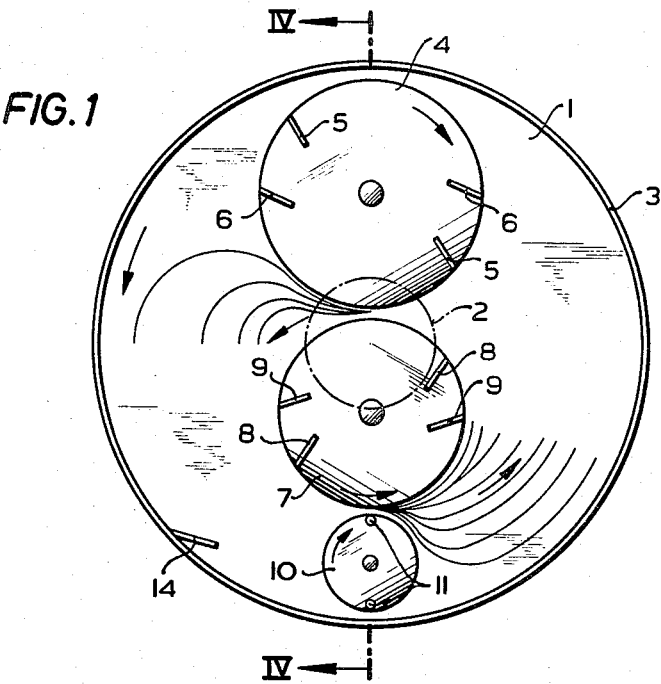
FIG. 1 is a plan view of a mixer comprising a system of implements moving in the opposite direction, a system of implements moving in the same direction, and a rapidly-moving mixing and crushing implement.
Figure 4:
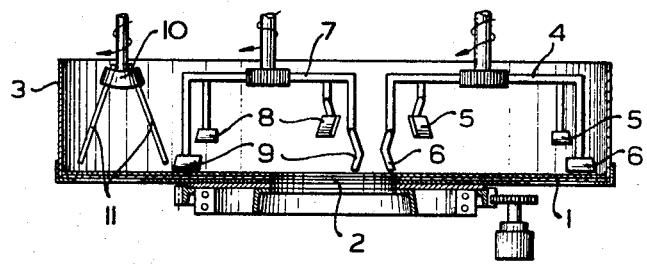
FIG. 4 is a diagrammatic vertical radial section taken along the line IV—IV shown in FIGS. 1 and 3, but without the blade or baffle.

In the embodiment in FIGS. 1 and 4 the two systems 4 and 7 are arranged diametrically opposite one another in relation to the rotary axis of the bowl. The system 4 sweeps over the space from almost at the side wall 3 to above the emptying orifice 2 and the system 7 is smaller and extends considerably further over the orifice 2, although it is considerably further away from the side wall 3. In otherwise unswept area so left there is a fast-moving mixing and crushing implement 10 in the form of a plurality of straight rods 11 diverging downwardly, the bars being driven about an axis which is parallel with the rotary axis of the bowl and at a peripheral velocity which is a multiple of the peripheral velocity of the systems of implements 4 and 7. FIG. 1 includes some flow lines for the movement of the material being mixed brought about by the implement 10 together with the system of mixing implements 7.

Figure 2:
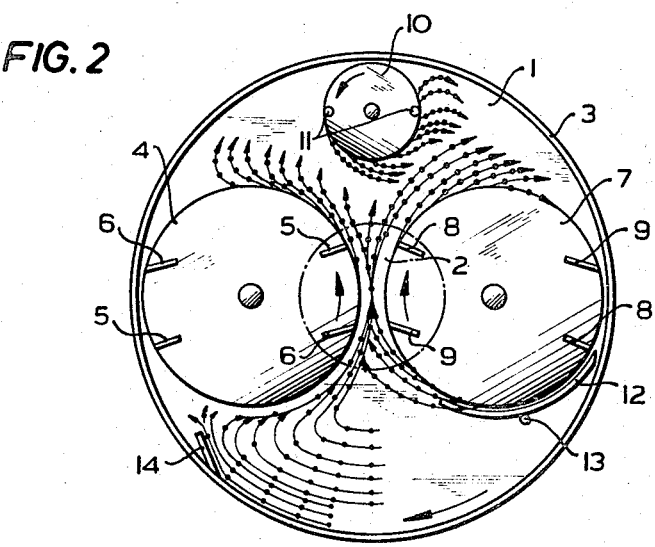
FIG. 2 is a similar view of a mixer made up from the same elements but in a different arrangement, and with a blade at the bottom.

In the FIG. 2 example the systems 4, 7 and 10 are arranged somewhat differently from the arrangement in FIG. 1. The systems 4 and 7 are symmetrical with one another and each has substantially half the diameter of the bowl. The implement 10 here lies on the axis of symmetry of the two systems 4 and 7 in a peripheral direction. Some flow lines are again shown for the material in the bowl 1, the different flow velocities of the various threads of current being indicated by different spacing between the dots marked on the threads. The smaller the spacing between the dots, the greater is the velocity flow.

In this embodiment a stationary bottom blade 12 is provided adjacent to the system 7 and behind it relative to the rotary direction of the mixing pan; the blade 12 surrounds about 90° of the periphery of the system 7, starts substantially at the radially-outermost portion of the area swept by the system 7, and stands immediately above the bottom 1 of the bowl. The maximum height of the blade 12 is about 30% of the depth of material to be mixed in the bowl 1, 3. The blade 12 is suspended in a resiliently yielding manner from a support 13 or a plurality of such supports. It produces a marked acceleration in the emptying process when the orifice 2 is open, since the last part of material left in the bowl is moved vigorously towards the orifice 2 by the system 7. A stationary scraper 14 for the side wall 3 of the bowl (which is also included in the FIG. 1 embodiment) is mounted closely in front of the counter-rotating system 4 (in the rotary direction of the bowl 1), so that the material scraped off the wall is moved to the orifice 3 by the system 4 in the fastest possible way.

Figure 3:
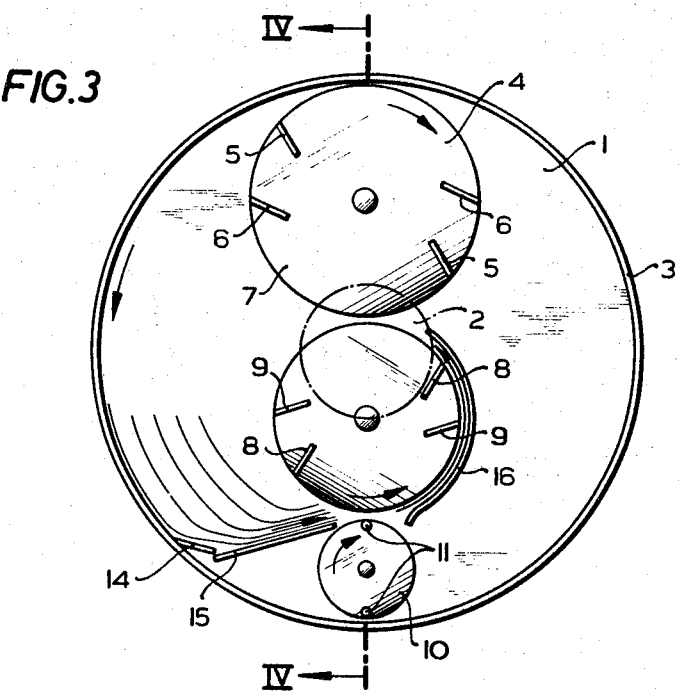
FIG. 3 is a plan view of a mixer made up from the same elements and in the same arrangement as the FIG. 1 embodiment, but provided with baffles which can be raised and lowered.

In the FIG. 3 embodiment the systems of implements 4, 7 and 10 are arranged in the same way as in FIG. 1. In addition to the construction in FIG. 1, FIG. 3 includes a baffle 15 adapted to be raised and lowered and leading inwardly substantially from the side wall 3 to the area swept by the system 7, the baffle 15 being provided in front of the implement 10 as seen in the rotary direction of the bowl 1, 3. In the wake of the system 7 is provided a further baffle 16, which surrounds about 90° of the periphery of the system 7, starts at the radially-outermost part of the area swept by the system 7, and in the example illustrated extends to the edge of the emptying orifice 2. The two baffles 15 and 16 are automatically lowered almost to the bottom of the bowl when the orifice 2 is opened, thereby considerably enhancing the discharging action of the system 7, and cancelling out the action of the implement 10, which might impair the emptying operation when the emptying orifice is closed. The two baffles 15, 16 are raised to above the surface of the material to be mixed so that they can in no way impair the mixing operation. The stationary scraper 14 for the side wall is immediately in front of the radially outer end of the baffle 15, as seen in the rotary direction of the bowl, so that the material which it scrapes off is also passed rapidly to the discharge orifice 2 by way of the baffle 15 and system 7.

In all embodiments the scraper 14 may be provided at its lower end with a rudder-like, inwardly-projecting fin to enhance the emptying action.

In every embodiment two pairs of paddles 5, 6 and 8, 9 are shown for each of the systems 4 and 7; more such pairs of paddles may of course be provided. As will be seen from FIG. 4, the paddles 5 and 8 take in only the upper level of the material being mixed, while each paddle 6 or 9 takes in only the lower level and the latter are directed at an acute angle relatively to the rotary axis and substantially at the same radius as the respective paddle 5 or 8, so that the second implement runs, so to speak, within and below a furrow formed by the first one. The angular position of the lower paddles 6 and 9 is chosen so as to make the process of emptying through the orifice 2 as rapid as possible, and the angular position of the upper paddles 5 and 8 is adapted to produce the best possible mixing action. It has generally been found advisable to provide for an inwardly directed action counteracting the centrifugal force for freely-flowing materials, and an outwardly-directed action for less readily flowing and plastics materials. This can be done without any difficulty by appropriately selecting the inclination of the paddles.

FIG. 5 is a view of the side wall showing the scraper 14 therefor and the baffles 15 and 16 in the lowered position—the raised position being shown in dotted lines—and fluid operated means 17 and 18 for moving the two baffles being represented diagrammatically. The drives for the raising and lowering means 17 and 18 are included in the energisation circuit (not shown) in such a way that, as already mentioned; the baffles are lowered onto the bottom of the bowl when the cover plate for the emptying orifice 2 is also lowered, and are raised above the level of the material being mixed when the orifice is closed.

FIGS. 6 and 7 show the outside of a particularly large mixing machine with a bowl diameter of about 4.5 metres and a capacity of about 8,000 litres or about 16 tons of material. In principle however, the construction is the same as for mixers of smaller diameter as in FIGS. 1 to 5. The machine rests on a foundation frame A and is held by uprights B engaging the side walls 3 of the bowl. The reinforced base plate of the bowl rests on rollers C and the bowl is rotated by means of a circular rack D mounted on the bottom of the mixing bowl and engaged by gearwheels F driven by one or more electric motors E. Vents G are provided in the lid of the mixing bowl housing, and the side wall of the housing contains observation apertures H, in the form of windows which can be opened. FIGS. 6 to 8 further show diagrammatically actuating means I for raising and lowering the cover plate for the emptying orifice 2 and motors K, L and M for the systems of mixing implements and the whirling rods. As shown in FIG. 8, two motors working on one spur wheel are provided for each of the large systems, although basically one motor with a stronger spur wheel could be provided in each case.

As shown in FIGS. 9 and 10, altogether four systems of mixing implements 4, 4'm 7 and 7', and two sets of whirling rods 10, 10' are fitted. The axes of the systems are all in a straight line because of the large diameter of the pan, but the rotary axes of the systems 4 and 7' are those of 4' and 7, are substantially diametrically opposite one another. The systems 7 and 4' which in this example are smaller in diameter, are laterally offset from the line joining the axes of the larger systems 4 and 7'. In this way a greater distance can be left between the paddles of the various systems, yet the working areas of the systems will still overlap in a radial direction. This has a favourable effect on the mixing action for, as indicated by the flow lines in FIG. 9, the circular current produced by the rotation of the pan is overlaid with an opposite current produced by the system 4, and a cross-current produced by the systems 7', 4' and 7. As illustrated, the cross-current passes across the emptying orifice 2 and so encourages rapid discharge once intensive mixing has taken place. Such mixing is greatly aided by the whirling rods 10 and 10'. Moreover the machine shown in FIG. 9 is largely insensitive to coarse grained additives, e.g. such as those used in the manufacture of coarse concrete.

As shown in FIG. 10, the system 7' may be driven in the opposite direction to that shown in FIG. 9, i.e. in the opposite direction to the pan 1 whereas the system 4 in any case rotates in the opposite direction to the bowl. In the majority of applications the second outer system 7' will be rotated in the same direction as the bowl but at a higher peripheral speed so as to produce the cross-current illustrated in FIG. 9. But if one or more systems are equipped with grinders instead of the paddles illustrated or if the material to be processed is in very large lumps or is very viscous or very stiff the drive shown in FIG. 10 is recommended since in such cases the material could accumulate and be crushed against the wall 3 of the bowl if the system 7' were moving in the same direction as the bowl.

During the emptying operation the entire area of the pan is covered by the stationary bottom blades 16 and 16', so discharge is very rapid. If the machine is to be used for loading portable mixers mounted on vehicles and constructed in such a way that a large mixing machine as shown in FIGS. 6 to 10 cannot be emptied rapidly, the emptying process may be delayed by varying the rotary speed of the pan drive E. If required, emptying may of course be accelerated by switching the drive over to higher speeds.

The illustrated embodiments of mixers according to the invention should be regarded purely as examples. In particular the number and size of systems of implements and whirling rods used may be varied and combined as desired. An expert will be able to determine the variations required by taking into account the requirements of the material, such as the need to increase the early and final hardness of concrete or the need to economise in cement.

We claim:

1. A mixer comprising a bowl mounted for rotation, means for rotating the bowl in one direction, a first system of mixing paddles mounted for rotation about an axis spaced from and parallel to the axis of rotation of the bowl, means for rotating said first system of paddles in a direction opposite the direction of rotation of the bowl, a second system of paddles mounted for rotation about an axis positioned substantially diametrically opposite the axis of the first system, the first and second systems of rotating mixing paddles each having an effective diameter substantially equal to one-half the diameter of the bowl, means for rotating said second system of paddles in the same direction of rotation as the bowl, and said means for rotating said bowl and the second system of paddles driving the radially outermost portion of its paddles at a higher relative speed than the adjacent region of the bottom of the bowl whereby the first and second systems of paddles rotate in opposite directions and extend across and sweep substantially the whole cross-sectional area of the bowl with a movement relative to the bowl.

2. A mixer as claimed in claim 1 in which the means for rotating the second system of paddles drives the latter at a higher peripheral speed than the first system.

3. A mixer as claimed in claim 1 including disintegrating rods rotatable about an axis in a common plane with the axes of the first and second systems, a baffle which is mounted for movement to adapt it to be raised and lowered, said baffle in its lowered position lying in front of the rotating rods with respect to the direction of rotation of the bowl, said baffle extending inwardly substantially from the side wall of the bowl to a position adjacent the side of the second system of paddles, said bowl having a centrally located outlet opening in its bottom wall, and means connected to lower the baffle to a position adjacent the bottom of the bowl and open the outlet opening in the bowl and to lift the baffle above the surface of the material being mixed in the bowl and close the outlet opening in the bowl.

4. A mixer as claimed in claim 1 including an arcuate blade positioned adjacent the second system and extending through an arc of at least 90° around the periphery of the second system of paddles, said arcuate blade starting at a point adjacent the first system of paddles.

5. A mixer as claimed in claim 1 in which the bowl has a central outlet opening in its bottom wall, and means for opening and closing said outlet opening.

6. A mixer as claimed in claim 1 including a stationary scraper mounted adjacent the side wall of the bowl and in close proximity to the front of the first system.

7. A mixer as claimed in claim 6 in which the side wall scraper is provided at its lower edge with an inwardly projecting fin.

8. A mixer as claimed in claim 1 in which there is at least one additional system of paddles provided between the first and second systems, and means to rotate at least one of said additional systems.

9. A mixer as claimed in claim 8 in which two additional systems of paddles are provided, one of said systems being adapted to be driven in the same direction of rotation as the bowl, and the other in the opposite direction.

10. A mixer as claimed in claim 9 in which the axis of the additional systems are laterally offset from a line joining the axis of the first and second systems, and in which the additional systems overlap the outlet opening in the bowl.

11. A mixer as claimed in claim 9 in which the additional systems of paddles are smaller in diameter than the first and second systems of paddles.

12. A mixer in accordance with claim 1 having an arcuate blade extending from a point adjacent the peripheral wall of the bowl through an arc of at least 90° around and adjacent to the periphery of the second system of paddles in the direction of rotation of said paddles.

13. A mixer in accordance with claim 1 in which the means for rotating the first and second systems of paddles comprises an individual driving means for each system.

References Cited
UNITED STATES PATENTS

| | | | |
|---|---|---|---|
| 3,109,632 | 11/1963 | Wiegel | 259—175 X |
| 3,228,664 | 1/1966 | McMillan | 259—178 |
| 2,819,885 | 1/1958 | Baechle | 259—84 |

ROBERT W. JENKINS, *Primary Examiner.*

U.S. Cl. X.R.

259—177, 179